United States Patent
Obiya et al.

(10) Patent No.: US 10,116,348 B2
(45) Date of Patent: Oct. 30, 2018

(54) HIGH-FREQUENCY POWER AMPLIFYING MODULE AND COMMUNICATION APPARATUS

(71) Applicant: Murata Manufacturing Co., Ltd., Kyoto (JP)

(72) Inventors: Hidenori Obiya, Kyoto (JP); Shinya Hitomi, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/635,710

(22) Filed: Jun. 28, 2017

(65) Prior Publication Data
US 2017/0302328 A1    Oct. 19, 2017

Related U.S. Application Data

(63) Continuation of application No. PCT/JP2016/051202, filed on Jan. 18, 2016.

(30) Foreign Application Priority Data

Jan. 21, 2015 (JP) ................................. 2015-009832
May 15, 2015 (JP) ................................. 2015-099996

(51) Int. Cl.
*H04B 1/40* (2015.01)
*H04B 1/00* (2006.01)
(Continued)

(52) U.S. Cl.
CPC ............ *H04B 1/525* (2013.01); *H04B 1/006* (2013.01); *H04B 1/0057* (2013.01); *H04B 1/0078* (2013.01); *H04B 1/04* (2013.01)

(58) Field of Classification Search
CPC .. H04B 1/0057; H04B 1/0078; H04B 1/0475; H04B 1/109; H04B 1/525; H04B 10/40;
(Continued)

(56) References Cited

U.S. PATENT DOCUMENTS

| 6,590,449 B2* | 7/2003 | Matsuura ............... H03F 1/3229 330/149 |
| 8,681,748 B2* | 3/2014 | Medapalli .............. H04B 1/406 370/334 |

(Continued)

FOREIGN PATENT DOCUMENTS

| JP | 2004-222171 A | 8/2004 |
| JP | 2004222171 A * | 8/2004 |

(Continued)

OTHER PUBLICATIONS

International Search report dated Mar. 29, 2016 in PCT/JP2016/051202.
Written Opinion dated Mar. 29, 2016 in PCT/JP2016/051202.

*Primary Examiner* — Quochien B Vuong
(74) *Attorney, Agent, or Firm* — Pearne & Gordon LLP

(57) ABSTRACT

A high-frequency power amplifying module is provided for a communication device that simultaneously uses at least a radio wave in a first band and a radio wave in a second band, and a first high-frequency power amplifier for the first band and a second high-frequency power amplifier for the second band are mounted. The first band and the second band are frequency bands that produce intermodulation distortion of a frequency included in the receive frequency band of the second band, due to a transmit frequency of the first band received by the first high-frequency power amplifier and a transmit frequency of the second band received h the second high-frequency power amplifier. The second high-frequency power amplifier includes a filter that blocks a signal at the transmit frequency of the first band.

12 Claims, 10 Drawing Sheets

(51) Int. Cl.
*H04B 1/525* (2015.01)
*H04B 1/04* (2006.01)

(58) Field of Classification Search
CPC .................. H04B 10/697; H04B 15/00; H04B 2001/0408; H03F 1/32; H03F 1/3223
USPC ......... 455/63.1, 67.13, 78, 83, 84, 295, 296, 455/307, 552.1, 553.1
See application file for complete search history.

(56) References Cited

U.S. PATENT DOCUMENTS

| | | | |
|---|---|---|---|
| 8,917,792 B2 * | 12/2014 | Black | H04B 15/00 375/259 |
| 9,762,274 B2 * | 9/2017 | Rai | H04B 1/12 |
| 2006/0105715 A1 * | 5/2006 | Kodani | H03F 1/32 455/63.1 |
| 2013/0044791 A1 | 2/2013 | Rimini et al. | |
| 2013/0147678 A1 | 6/2013 | Taniguchi | |
| 2014/0329475 A1 | 11/2014 | Ella et al. | |
| 2014/0347126 A1 | 11/2014 | Laporte et al. | |

FOREIGN PATENT DOCUMENTS

| | | | | |
|---|---|---|---|---|
| JP | 2011-135539 A | 7/2011 | | |
| JP | WO 2012020595 A1 * | 2/2012 | ............ | H03H 9/725 |
| JP | 2014-526847 A | 10/2014 | | |
| WO | 2012/020595 A1 | 2/2012 | | |
| WO | 2013/026038 A1 | 2/2013 | | |
| WO | 2014/199003 A1 | 12/2014 | | |

* cited by examiner

FIG. 5

| BAND | TRANSMIT FREQUENCY BAND [MHz] | RECEIVE FREQUENCY BAND [MHz] |
|---|---|---|
| B1 | 1920~1980 | 2110~2170 |
| B2 | 1850~1910 | 1930~1990 |
| B3 | 1710~1785 | 1805~1880 |
| B4 | 1710~1755 | 2110~2155 |
| B5 | 824~849 | 869~894 |
| B6 | 830~840 | 875~885 |
| B7 | 2500~2570 | 2620~2690 |
| B8 | 880~915 | 925~960 |
| B9 | 1749.9~1784.9 | 1844.9~1879.9 |
| B10 | 1710~1770 | 2110~2170 |
| B11 | 1427.9~1447.9 | 1475.9~1495.9 |
| B12 | 699~716 | 729~746 |
| B13 | 777~787 | 746~756 |
| B14 | 788~798 | 758~768 |
| B15 | | |
| B16 | | |
| B17 | 704~716 | 734~746 |
| B18 | 815~830 | 860~875 |
| B19 | 830~845 | 875~890 |
| B20 | 832~862 | 791~821 |
| B21 | 1447.9~1462.9 | 1495.9~1510.9 |
| B22 | 3410~3490 | 3510~3590 |
| B23 | 2000~2020 | 2180~2200 |
| B24 | 1626.5~1660.5 | 1525~1559 |
| B25 | 1850~1915 | 1930~1995 |
| B26 | 814~849 | 859~894 |

FIG. 6

| f2  | IMD2 [MHz]          | IMD3 [MHz]       | IMD4 [MHz]         | IMD5 [MHz]       | IMD7 [MHz]       |
|-----|---------------------|------------------|--------------------|------------------|------------------|
| B8  |                     |                  | 930 960 855 1035   |                  |                  |
| B5  | 886 936 861 961     |                  |                    |                  |                  |
| B26 | 896 936 861 971     |                  |                    |                  |                  |
| B19 | 880 940 865 955     |                  |                    |                  |                  |
| B5  | 886 906 861 931     |                  |                    |                  |                  |
| B20 |                     | 784 809 749 844  |                    | 736 756 666 826  | 688 703 583 808  |

HIGH-FREQUENCY POWER AMPLIFYING MODULE AND COMMUNICATION APPARATUS

This is a continuation of International Application No. PCT/JP2016/051202 filed on Jan. 18, 2016 which claims priority from Japanese Patent Application No. 2015-099996 filed on May 15, 2015 and Japanese Patent Application No. 2015-009832 filed on Jan. 21, 2015. The contents of these applications are incorporated herein by reference in their entireties.

BACKGROUND

Technical Field

The present disclosure relates to a high-frequency power amplifying module provided in a communication apparatus that is compatible with carrier aggregation in which radio waves in multiple bands for different frequencies are simultaneously used, and also relates to the communication apparatus.

In wireless communication performed between a mobile station such as a cellular phone and a wireless relay base station, carrier aggregation in which radio waves in multiple bands for different frequencies are simultaneously used is performed. For example, a disclosure about a front-end circuit for carrier aggregation is described in Patent Document 1.

According to the carrier aggregation technique, for example, a frequency band (channel) of 10 MHz width, 20 MHz width, or the like is used as a base unit, and multiple channels for different frequencies are simultaneously used to perform communication. Thus, wide-band communication is capable of being substantially performed, and advantages, such as "an increase in speed and stabilization in communication", "the frequency diversity effect", and "the statistical multiplexing effect", are produced.

Patent Document 1: Japanese Unexamined Patent Application Publication (Translation of PCT Application) No. 2014-526847

BRIEF SUMMARY

For example, in LTE (Long Term Evolution)-Advanced (the standard defined by International Telecommunications Union-Radio Communication Sector (ITU-R)), in the case where two bands are used to perform carrier aggregation, the frequency band of intermodulation distortion caused by a transmit signal in a first band and a transmit signal in a second band may overlap/include/be included in the frequency band of a receive signal in the second band.

As a general representation, the transmit frequency band of the first band is represented by f1, and the transmit frequency band of the second band is represented by f2. When f1>f2, intermodulation distortion IMD2, IMD3, IMD4, IMD5, and IMD7 is produced in a transmit signal path of a communication device such as a portable terminal. For example, the intermodulation distortion is expressed as follows.

| | |
|---|---|
| f1−f2 | IMD2 |
| 2×f2−f1 | IMD3 |
| 3×f2−f1 | IMD4 |
| 3×f2−2×f1 | IMD5 |
| 4×f2−3×f1 | IMD7 |

The frequency band of the intermodulation distortion may overlap/include/be included in the frequency band of a receive signal in the second band.

For example, when carrier aggregation using the transmit frequency bands of BAND 3 and BAND 8 of LTE is performed in a portable terminal, a signal component of the frequency band (930 to 1035 Mz) corresponding to the intermodulation distortion IMD4, that is, the difference between the frequency that is three times as much as the transmit frequency band of BAND 8 and the transmit frequency band of BAND 3 overlaps the receive frequency band (925 to 960 MHz) of BAND 8. Therefore, a component of the intermodulation distortion IMD4 is superimposed on a receive signal of BAND 8, which is received by a receiving circuit. As a result, a problem arises in that the receiver sensitivity of BAND 8 is degraded by a large amount.

The present disclosure provides a high-frequency power amplifying module and a communication apparatus including the high-frequency power amplifying module. The high-frequency power amplifying module contributes to suppression of occurrence of intermodulation distortion caused by a transmit signal in a first band and a transmit signal in a second band in carrier aggregation. Further, the present disclosure provides a high-frequency power amplifying module and a communication apparatus including the high-frequency power amplifying module. The high-frequency power amplifying module contributes to prevention of degradation in receiver sensitivity which is caused by superimposition of the described-above intermodulation distortion signal on a receive signal of a communication device such as a portable terminal.

A high-frequency power amplifying module provided by the present disclosure is provided for a communication device that simultaneously uses at least a radio wave in a first band and a radio wave in a second band. The high-frequency power amplifying module is a module in which a first high-frequency power amplifier for the first band and a second high-frequency power amplifier for the second band are disposed. The first band and the second band are frequency bands that are likely to produce intermodulation distortion due to a transmit frequency of the first band and a transmit frequency of the second band. The intermodulation distortion generates a frequency included in a receive frequency band of the second band. The transmit frequency of the first band is received by the first high-frequency power amplifier. The transmit frequency of the second band is received by the second high-frequency power amplifier. The second high-frequency power amplifier includes a first transmission filter that blocks a signal at the transmit frequency of the first band.

A communication apparatus provided by the present disclosure includes the high-frequency power amplifying module and a high-frequency circuit coupled to the high-frequency power amplifying module.

The present disclosure achieves suppression of occurrence of intermodulation distortion which is caused by a transmit signal in a first band and a transmit signal in a second band in carrier aggregation. This enables prevention of degradation in receiver sensitivity which is caused by superimposition of an intermodulation distortion signal on a receive signal of a communication device such as a portable terminal.

BRIEF DESCRIPTION OF THE SEVERAL VIEWS OF THE DRAWINGS

FIG. 5 is a diagram illustrating the transmit frequency bands and the receive frequency bands of some of multiple LTE bands.

FIG. 6 is a diagram illustrating the frequency bands of intermodulation distortion produced when carrier aggregation is performed by using two of bands B1 to B26.

DETAILED DESCRIPTION

Figure 1:
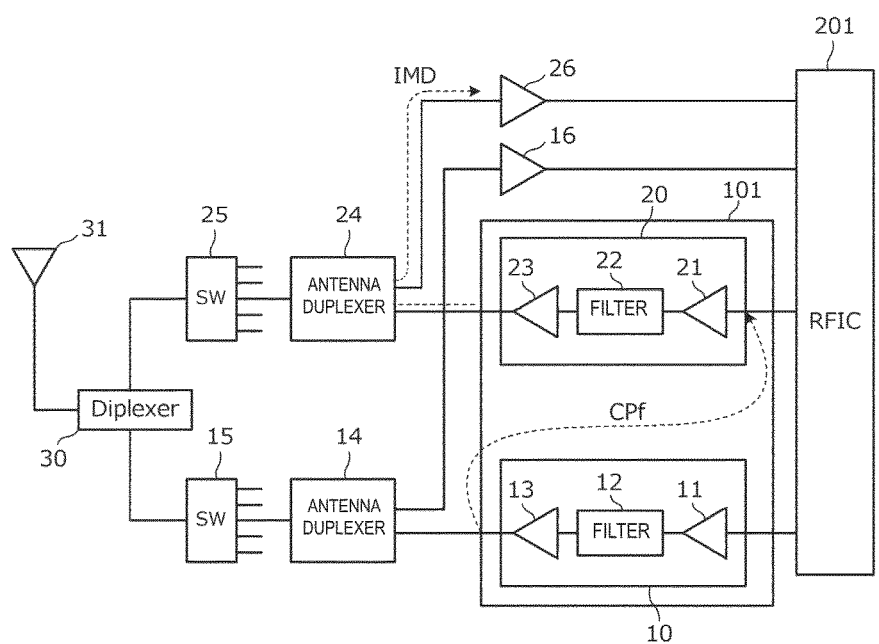
FIG. 1 is a block diagram illustrating the configuration of a high-frequency circuit unit of a portable terminal including a high-frequency power amplifying module according to a first embodiment.

Referring to the drawings, multiple embodiments for carrying out the present disclosure will be described below by taking some specific examples. The same components are designated with the same reference numeral in the drawings. In a second embodiment and its subsequent embodiments, descriptions common to a description about a first embodiment will not be made, and different points will be described. In particular, similar effects caused by a similar configuration will not be described in each embodiment.

First Embodiment

FIG. 1 is a block diagram illustrating the configuration of a high-frequency circuit unit of a portable terminal including a high-frequency power amplifying module according to the first embodiment. The high-frequency circuit unit of the portable terminal includes a high-frequency power amplifying module 101, antenna duplexers 14 and 24, switches 15 and 25, a diplexer 30, and an antenna 31.

A high-frequency power amplifier 10, the antenna duplexer 14, and the switch 15 form a transmission circuit for a first band. A high-frequency power amplifier 20, the antenna duplexer 24, and the switch 25 form a transmission circuit for a second band. The high-frequency power amplifier 10 receives a transmit signal in the first band, and the high-frequency power amplifier 20 receives a transmit signal in the second band.

The high-frequency power amplifying module 101 includes the first high-frequency power amplifier 10 and the second high-frequency power amplifier 20. The first high-frequency power amplifier 10 and the second high-frequency power amplifier 20 are mounted on a common (single) board, and are formed as a single high-frequency power amplifying module 101. However, the present disclosure may be applied even to a case in which the first high-frequency; power amplifier 10 and the second high-frequency power amplifier 20 are mounted on different respective boards.

The high-frequency power amplifying module 101 is coupled to given transmit ports of an RFIC (Radio Frequency Integrated Circuits) 201 that is a high-frequency circuit. Given transmit signals are output from the transmit ports of the RFIC 201 to the high-frequency power amplifying module 101.

The first high-frequency power amplifier 10 includes an upstream amplifier 11, an intermediate filter 12, and a downstream amplifier 13. The second high-frequency power amplifier 20 includes an upstream amplifier 21, an intermediate filter 22, and a downstream amplifier 23.

The upstream amplifier 11 preamplifies a transmit signal in the first band, and drives the downstream amplifier 13. The intermediate filter 12 is a filter that passes a transmit signal in the first band and that blocks a signal at a transmit frequency of the second band. The intermediate filter 12 is an exemplary "second transmission filter" provided by the present disclosure. The downstream amplifier 13 amplifies the power of a signal having passed through the intermediate filter 12. Similarly, the upstream amplifier 21 preamplifies a transmit signal in the second band, and drives the downstream amplifier 23. The intermediate filter 22 is a filter that passes a transmit signal in the second band and that blocks a signal at a transmit frequency of the first band. The intermediate filter 22 is an exemplary "first transmission filter" provided by the present disclosure. The downstream amplifier 23 amplifies the power of a signal having passed through the intermediate filter 22. The characteristics and operations of the intermediate filter 22 will be described in detail below.

An LNA (low-noise amplifier) 16 amplifies a receive signal in the first band, and an LNA 26 amplifies a receive signal in the second band. The LNA 16 outputs the amplified receive signal in the first band, and the LNA 26 outputs the amplified receive signal in the second band. The outputs from the LNAs 16 and 26 are coupled to given receive signal ports of the RFIC 201. The antenna duplexer 14 performs wave separation into transmit and receive signals in the first band. The antenna duplexer 24 performs wave separation into transmit and receive signals in the second band. These antenna duplexers 14 and 24 are each formed of a low-pass filter for passing a transmit signal and a high-pass filter for passing a receive signal.

The switch 15 is a so-called SPT (Single Pole x Through, one to many) high-frequency switch, and includes multiple particular ports and a single common port. The high-frequency switch 15 selects one of the communication circuits coupled to the multiple particular ports, and couples the selected port to the common port. Similarly, the switch 25 is also an SPxT high-frequency switch, and includes multiple particular ports and a single common port. The high-frequency switch 25 selects one of the communication circuits coupled to the multiple particular ports, and couples the selected port to the common port. In FIG. 1, circuits coupled to the ports other than the particular ports coupled to the antenna duplexers 14 and 24 are not illustrated.

The diplexer 30 is a wave separator that performs wave separation into transmit and receive signals in the first band and transmit and receive signals in the second band. The diplexer 30 includes a high-pass filter for passing a transmit/receive signal in the first band and a low-pass filter for passing a transmit/receive signal in the second band. The high-pass filter may be a band-pass filter. The low-pass filter may be a band-pass filter.

The antenna 31 is a dual-band antenna or a wide-band antenna used in the frequency bands of the first band and the second band.

In FIG. 1, when the first high-frequency power amplifier 10 is disposed close to the second high-frequency power amplifier 20, the first high-frequency power amplifier 10 and the second high-frequency power amplifier 20 are undesirably coupled through a space, for example, as illustrated by using a coupling path CPf indicated by using a dashed line.

Thus, the second high-frequency power amplifier 20 receives a transmit signal in the second band and a transmit signal in the first band. If the intermediate filter 22 is a filter having band-pass characteristics for simply passing the transmit frequency band of the first band, the nonlinearity of the upstream amplifier 21 and the downstream amplifier 23 produces an intermodulation distortion component caused by the second-band transmit signal and the first-band transmit signal.

In the above-described situation, the intermodulation distortion component is output (leaks) from the receive port of the antenna duplexer 24 in accordance with the isolation between the transmit port and the receive port of the antenna duplexer 24. Therefore, the intermodulation distortion component (IMD in FIG. 1) is output from the receive signal port of the antenna duplexer 24, and is superimposed on a receive signal in the second band. As a result, when the frequency band of the intermodulation distortion component is superimposed on the receive frequency band of the second band, the receiver sensitivity of the second band is degraded. Thus, the intermodulation distortion component superimposed on the receive frequency band of the second band is hereinafter called "an intermdoulation distortion component causing an interfering wave".

In contrast, according to the present embodiment, the intermediate filter 22 has band-pass characteristics for blocking (attenuating) a signal at a transmit frequency of the first band. Therefore, a signal at a transmit frequency of the first band in the downstream amplifier 23 may be attenuated. Thus, occurrence of the intermodulation distortion component causing an interfering wave may be suppressed.

Figure 2:
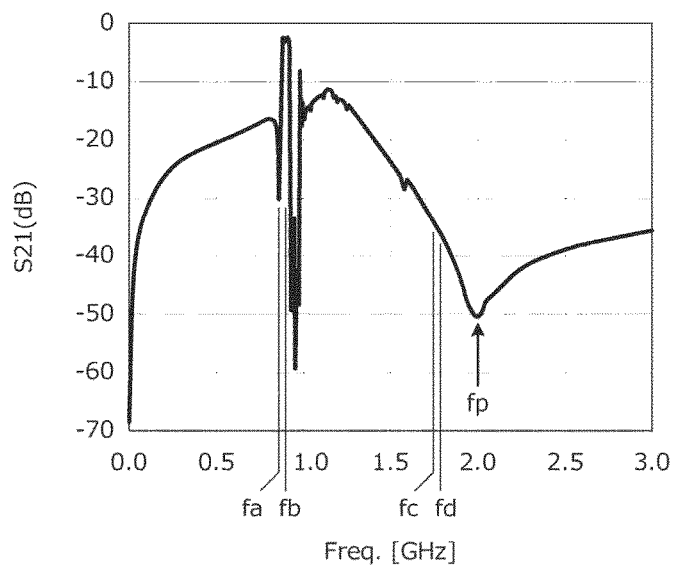
FIG. 2 is a diagram illustrating band-pass characteristics of an intermediate filter 22.

FIG. 2 is a diagram illustrating the band-pass characteristics of the intermediate filter 22. In this example, BAND 3 of LTE corresponds to the first band, and BAND 8 corresponds to the second band. The intermediate filter 22 passes a signal in the transmit frequency band (880 MHz to 915 MHz) of the second band (BAND 8) which is illustrated as frequencies fa to fb. The intermediate filter 22 has an attenuation pole at the frequency fp, and attenuates the transmit frequency band (1710 MHz to 1785 MHz) of the first band (BAND 3) which is illustrated as frequencies fc to fd, to about −35 dB.

The intermediate filter 22 is inserted upstream of the downstream amplifier 23. Accordingly, even when an input unit of the second high-frequency power amplifier 20 receives a first-band transmit signal through a space, the first-band transmit signal is attenuated by the intermediate filter 22. That is, a first-band transmit signal component caused by signal leakage from the outside may be removed, achieving suppression of occurrence of a state in which the intermodulation distortion component causing an interfering wave is produced in the downstream amplifier 23 of the second high-frequency power amplifier 20.

As long as the amount of attenuation of the first-band transmit signal in the intermediate filter 22 is an amount that satisfies desired IMD characteristics, any amount may be used. Desirably, the intermediate filter 22 has an amount of attenuation of −50 dB.

When the high-frequency power amplifier 20 is capable of amplifying signals in multiple frequency bands, the band-pass characteristics of the intermediate filter 22 are desirably variable.

An isolation of at least −45 dB is typically obtained between the transmit port and the receive port of the antenna duplexer 24. Therefore, −80 dB including −35 dB that is the amount of attenuation in the intermediate filter 22 may be obtained with certainty. Therefore, necessary spatial isolation between the first high-frequency power amplifier 10 and the second high-frequency power amplifier 20 becomes less. Therefore, the layout of the transmit-receive path for the first band and the transmit-receive path for the second band may be easily designed. For example, it is not necessary to make a design in which the physical distance between the first high-frequency power amplifier 10 and the second high-frequency power amplifier 20 is set large in order to improve the spatial isolation between the first high-frequency power amplifier 10 and the second high-frequency power amplifier 20, causing a high-frequency power amplifier to be easily designed. Thus, a module in which the first high-frequency power amplifier 10 and the second high-frequency power amplifier 20 are mounted on the same board may be formed.

A result of measuring an effect of improvement in the intermodulation distortion causing an interfering wave, in the high-frequency circuit unit including the second high-frequency power amplifier 20 including the intermediate filter 22 having characteristics illustrated in FIG. 2 will be described.

Figure 3:
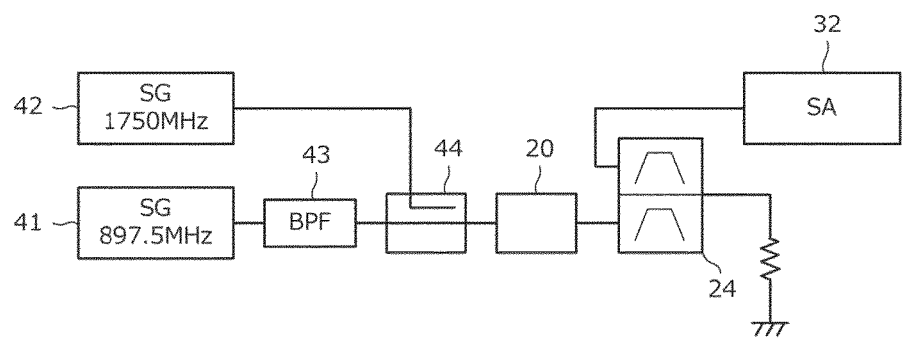
FIG. 3 illustrates a circuit for measuring an effect of improvement in intermodulation distortion causing an interfering wave, in the high-frequency circuit unit including the intermediate filter 22.

FIG. 3 illustrates a measurement circuit for the measurement. In FIG. 3, the input unit of the second high-frequency power amplifier 20 is coupled to a coupler 44. A first input unit of the coupler 44 is coupled to a first signal generating circuit 41 via a band-pass filter 43. A second input unit of the coupler 44 is coupled to a second signal generating circuit 42. The first signal generating circuit 41 generates a signal at 897 MHz that is the center frequency of the transmit frequency band of BAND 8. The second signal generating circuit 42 generates a signal at 1750 MHz that is the center frequency of the transmit frequency band of BAND 3. An output unit of the second high-frequency power amplifier 20 is coupled to a transmit signal port of the antenna duplexer 24. A receive signal port of the antenna duplexer 24 is coupled to a spectrum analyzer 32. The common port of the antenna duplexer 24 is resistively terminated.

By using such a measurement circuit, the output signal strength at the receive signal port of the antenna duplexer 24 was measured when the strength of a 1750-MHz signal that is an interfering wave was changed. Similar measurement was performed in the case where the second high-frequency power amplifier 20 does not include the intermediate filter 22.

Figure 4:
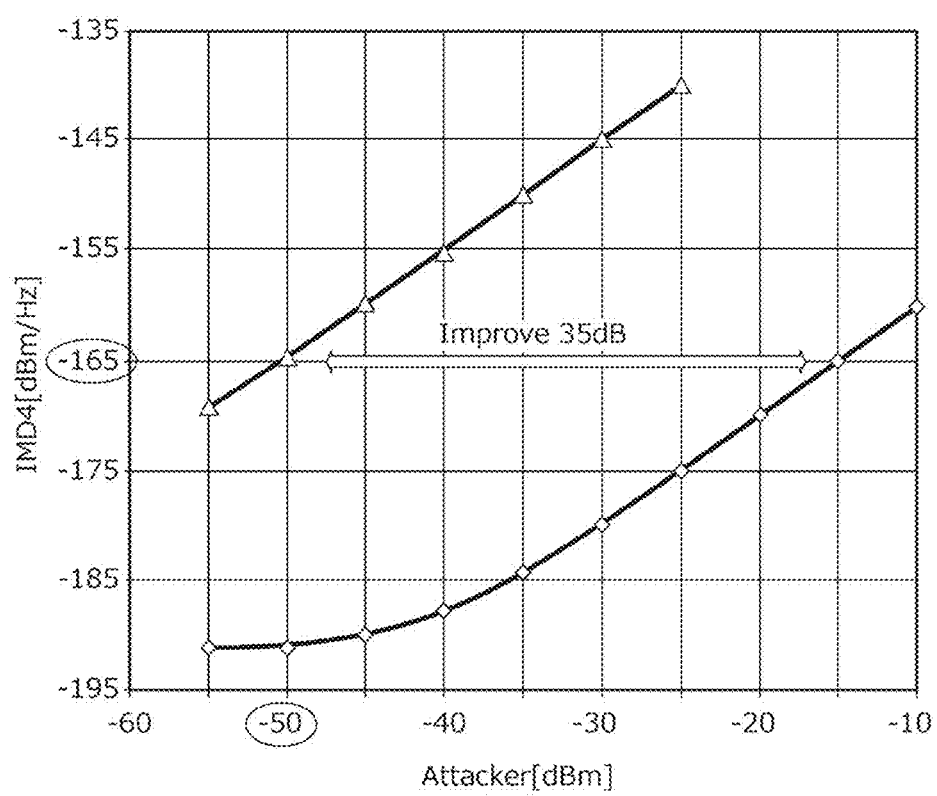
FIG. 4 is a diagram illustrating the relationship between an interfering wave and IMD4 which is obtained when the intermediate filter 22 is included, and the relationship which is obtained when the intermediate filter 22 is not included.

FIG. 4 is a diagram illustrating the result. The horizontal axis in FIG. 4 represents the strength of an interfering wave "Attacker" producing intermodulation distortion. The vertical axis in FIG. 4 represents the strength of IMD4 produced by the "Attacker". The interfering wave in the present embodiment is a transmission wave of the first band. In FIG. 4 line joining points plotted by using triangle markers represents characteristics obtained when the intermediate filter 22 is not provided. A line joining points plotted by using diamond-shaped markers represents characteristics obtained when the intermediate filter 22 is provided. In the both cases, the strength of the 897.5-MHz signal is 23 dBm.

As illustrated in FIG. 4, provision of the intermediate filter 22 causes IMD4 to be improved by about 35 dB.

If the permissible amount of degradation in receiver sensitivity which is caused by the IMD noise level produced in a high-frequency power amplifier is −3 dB, the IMD noise level corresponding to this is −165 dBm. As illustrated in FIG. 4, the IMD noise level becomes −165 dBm when the "Attacker" to the first high-frequency power amplifier and the second high-frequency power amplifier is at −50 dBm.

In contrast, the standard describes that the maximum output of a high-frequency power amplifier is to be set to 20 dBm. Therefore, when the isolation between the first high-frequency power amplifier and the second high-frequency power amplifier finally disposed at a physical distance corresponding to an isolation of −70 dB or less, the IMP noise level is at −165 dBm or less. That is, the degradation in receiver sensitivity which is caused by the IMP noise level falls within −3 dB. Therefore, as long as the first high-frequency power amplifier 10 and the second high-frequency power amplifier 20 are disposed at a distance that causes an isolation of −70 dB to be obtained with certainty, any configuration may be employed.

In the example described above, improvement in the intermodulation distortion IMD4 produced when carrier aggregation using BAND 3 and BAND 8 in LTE-Advanced is performed is described. The present disclosure is not limited to this. The present disclosure may be similarly applied to a case in which carrier aggregation using the first band and the second band which have a relationship in which the intermodulation distortion causing an interfering wave is produced due to a transmit frequency of the first band which is received by the first high-frequency power amplifier and a transmit frequency of the second band which is received by the second high-frequency power amplifier performed.

FIGS. 5 and 6 illustrate examples of the first band and the second band which have the "relationship in which the intermodulation distortion causing an interfering wave is produced" LTE-Advanced. FIG. 5 is a diagram illustrating the transmit frequency bands and the receive frequency bands of some of multiple bands in LTE. FIG. 6 is a diagram illustrating the frequency bands of intermodulation distortion produced when carrier aggregation using two of the bands B1 to B26 is performed. The relationship between the frequency bands f1 and f2 of two bands and the intermodulation distortion IMD2, IMD3, IMD4, IMD5, and IMD7 is described above.

In FIG. 6, a shaded frequency band is a frequency band of the intermodulation distortion overlapping/including/being included in the receive frequency band of the second band. For example, when the first band is B3 and the second band is B5, the frequency bands 886 MHz to 936 MHz and 861 MHz to 961 MHz of IMD2 overlap/include the receive frequency band 869 MHz to 894 MHz of the second band B5. Therefore, the bands B3 and B5 have the "relationship in which the intermodulation distort on causing an interfering wave is produced". In addition, for example, when the first band is B8 and the second band is B20, the frequency band 583 MHz to 808 MHz of IMD7 overlaps the receive frequency band 791 MHz to 821 MHz of the second band B20. Therefore, the bands B8 and B20 also have the "relationship in which the intermodulation distortion causing an interfering wave is produced".

Second Embodiment

Figure 7:
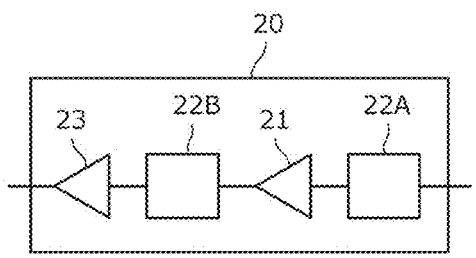
FIG. 7 is a block diagram illustrating the configuration or a second high-frequency power amplifier 20 according to a second embodiment.

FIG. 7 is a block diagram illustrating the configuration of the second high-frequency power amplifier 20 according to a second embodiment. The other configuration of the circuit unit (the high-frequency circuit unit of the portable terminal) is illustrated in the first embodiment in FIG. 1.

The second high-frequency power amplifier 20 illustrated in FIG. 7 includes an upstream filter 22A, the upstream amplifier 21, an intermediate filter 22B, and the downstream amplifier 23. The upstream filter 22A passes a signal in the transmit frequency band of the second band, and blocks a signal in the transmit frequency band of the first band which produces the intermodulation distortion causing an interfering wave. Therefore, even when a first-band transmit signal is coupled to the input unit of the high-frequency power amplifier 20 through a space, the upstream filter 22A suppresses the first-band transmit signal component, resulting in suppression of occurrence of the intermodulation distortion.

The intermediate filter 22B can also have characteristics for blocking the transmit frequency band of the first band. This improves the effect of suppression of a first-band transmit signal component received by the downstream amplifier 23.

On the output side (subsequent stage) of the downstream amplifier 23, a filter for blocking the transmit frequency band of the first band may be provided. In this case, even when a first-band transmit signal is directly received by the downstream amplifier 23 through a space, the filter suppresses the first-band transmit signal component, achieving the effect of suppressing occurrence of the intermodulation distortion produced in the downstream amplifier 23.

Third Embodiment

Figure 8:
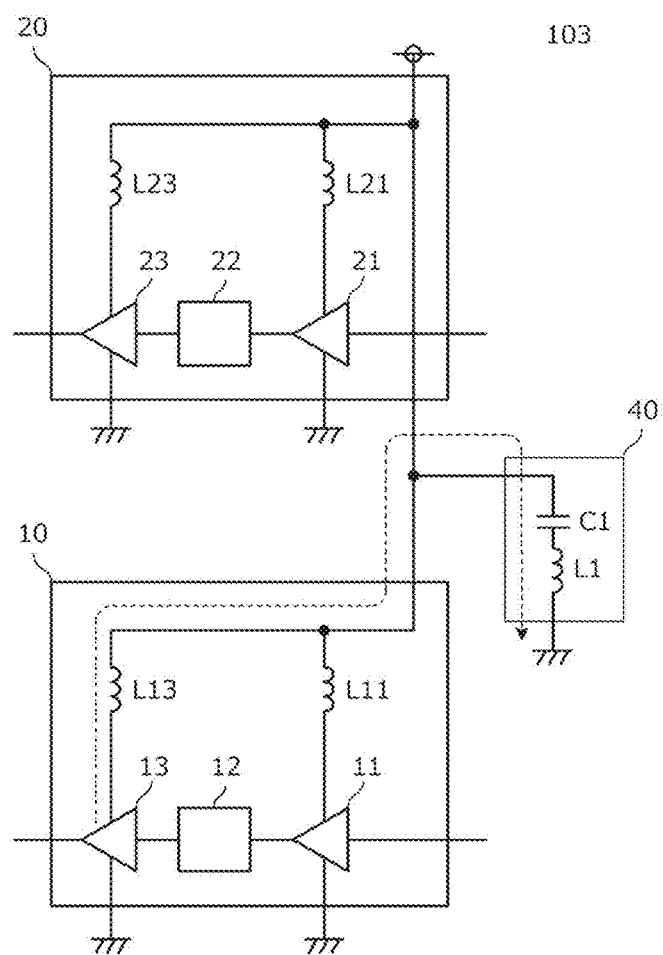
FIG. 8 is a block diagram illustrating the configuration of a high-frequency power amplifying module 103 according to a third embodiment.
Figure 9:
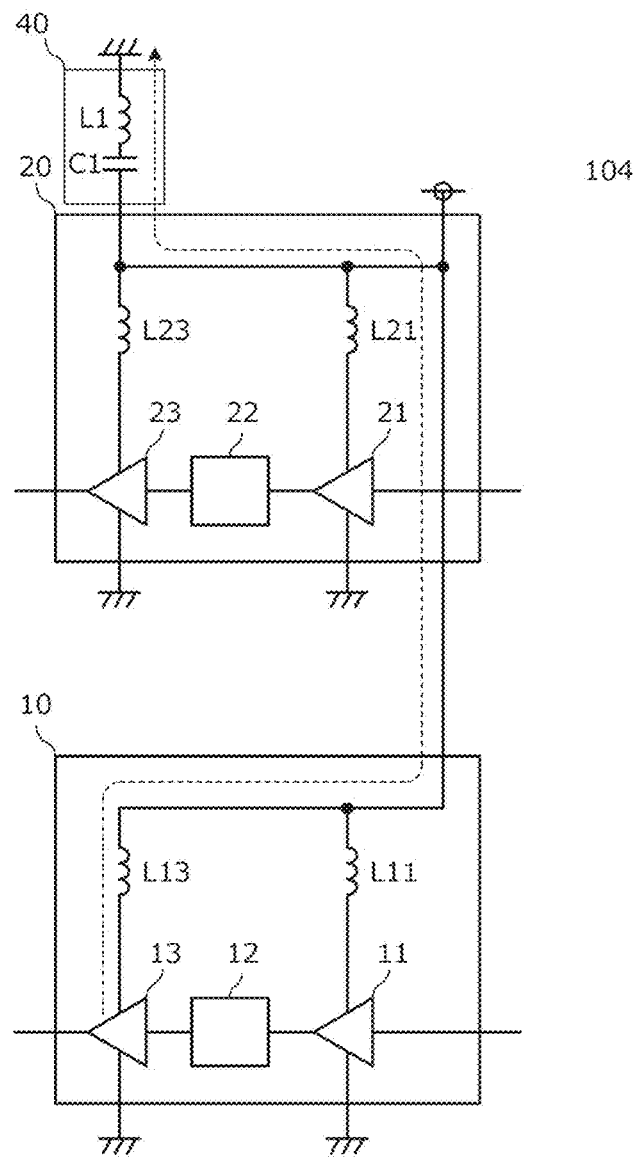
FIG. 9 is a block diagram illustrating a different high-frequency power amplifying module 104 according to the third embodiment.

FIG. 8 is a block diagram illustrating the configuration of a high-frequency power amplifying module 103 according to a third embodiment. FIG. 9 is a block diagram illustrating the configuration of a different high-frequency power amplifying module 104 according to the third embodiment. The other configuration of the circuit unit (the high-frequency circuit unit of the portable terminal) is illustrated in the first embodiment in FIG. 1.

The high-frequency power amplifying module 103 illustrated in FIG. 8 includes the first high-frequency power amplifier 10, the second high-frequency power amplifier 20, and a filter 40.

The first high-frequency power amplifier 10 includes the upstream amplifier 11, the intermediate filter 12, and the downstream amplifier 13. The second high-frequency power amplifier 20 includes the upstream amplifier 21, the intermediate filter 22, and the downstream amplifier 23. These configurations are the same as those illustrated in the first embodiment.

Choke coils L13 and L23 are coupled between the power terminals of the downstream amplifiers 13 and 23 and a power line. Similarly, choke coils L11 and L21 are coupled between the power terminals of the upstream amplifiers 11 and 21 and the power line.

The filter 40 is coupled between the power line and the ground. The filter 40 is formed as a series circuit having a capacitor C1 and an inductor L1, and attenuates a signal at a transmit frequency of the first band.

Power lines of the high-frequency power amplifiers 10 and 20 are coupled to each other, which forms a common power supply path. Therefore, if the filter 40 is not provided, a first-band transmit signal leaks into the upstream amplifier 21 of the second high-frequency power amplifier 20 through the power line. Thus, the first-band transmit signal is superimposed on an output signal (a transmit signal in the second band) from the second high-frequency power amplifier 20. As a result, in the second high-frequency power amplifier 20, intermodulation distortion caused by the first-band transmit signal and the second-band transmit signal may occur.

As illustrated by using the dashed-line arrow in FIG. 8, provision of the filter 40 causes the first-band transmit signal (noise) to be suppressed by the filter 40. Therefore, occurrence of the intermodulation distortion in the second high-frequency power amplifier 20 is suppressed.

The high-frequency power amplifying module 104 illustrated in FIG. 9 includes the first high-frequency power amplifier 10, the second high-frequency power amplifier 20, and the filter 40. Unlike the example illustrated in FIG. 8, the filter 40 is coupled to a portion near the power line of the downstream amplifier 23 of the second high-frequency power amplifier 20. Thus, provision of the filter 40 causes the first-band transmit signal (noise) to be suppressed by the filter 40 as illustrated by using the dashed-line arrow in FIG. 9. Therefore, occurrence of the intermodulation distortion in the second high-frequency power amplifier 20 is suppressed. In particular, as in the example illustrated in FIG. 9, provision of a filter in a portion near the power line of the downstream amplifier 23 of the second high-frequency power amplifier 20 effectively suppresses the first-band transmit signal (noise) received by the downstream amplifier 23. As a result, occurrence of the intermodulation distortion is effectively suppressed.

In the examples illustrated in FIGS. 8 and 9, the filter 40 is formed as an LC series circuit. However, various configurations other than this may be employed. For example, the filter 40 may be formed by using an inductor series-coupled to the power line and a capacitor shunt-coupled to the ground. Alternatively, the filter 40 may be formed as an LC parallel circuit. Instead, the filter 40 may be formed by using an inductor series-coupled to the power line. The inductor may be a so-called chip ferrite bead in which a coil pattern is formed on a ferrite base material.

Fourth Embodiment

In the fourth embodiment, an exemplary high-frequency power amplifying module including a bypass circuit for transmitting a signal through a path that does not go through an intermediate filter will be described. In addition, an exemplary high-frequency power amplifying module which is capable of changing the filter characteristics of an intermediate filter will be described.

Figure 10:
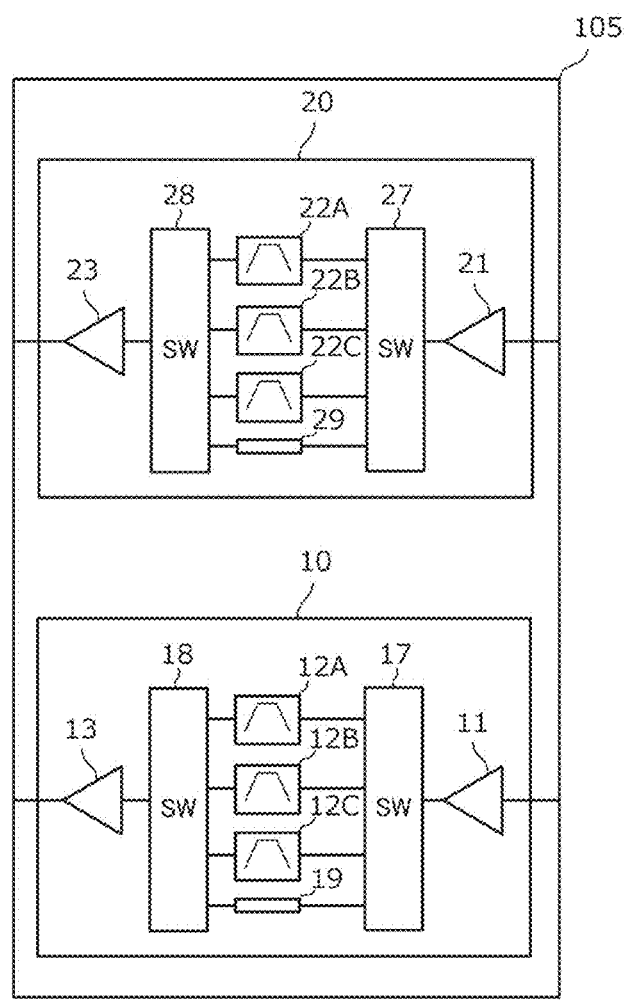
FIG. 10 is a block diagram illustrating the configuration of a high-frequency power amplifying module 105 according to a fourth embodiment.
Figure 11:
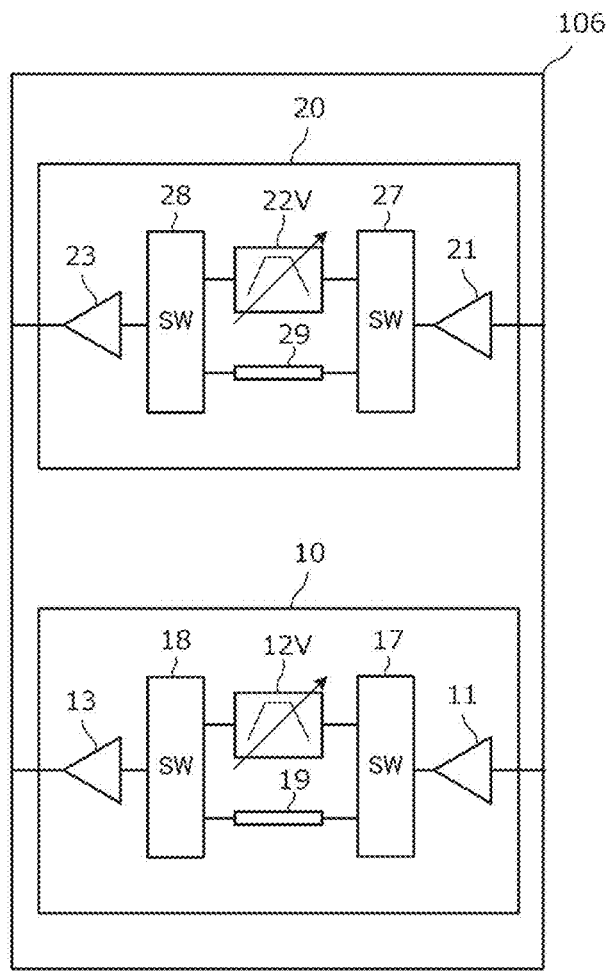
FIG. 11 is a block diagram illustrating the configuration of a different high-frequency power amplifying module 106 according to the fourth embodiment.

FIG. 10 is a block diagram illustrating the configuration of a high-frequency power amplifying module 105 according to the fourth embodiment. FIG. 11 is a block diagram illustrating the configuration of a different high-frequency power amplifying module 106 according to the fourth embodiment.

The high-frequency power amplifying modules 105 and 106 illustrated in FIGS. 10 and 11 are replaced, for example, with the high-frequency power amplifying module 101 of the high-frequency circuit unit illustrated in the first embodiment in FIG. 1.

In the high-frequency power amplifying module 105 illustrated in FIG. 10, the first high-frequency power amplifier 10 includes the upstream amplifier 11, switches 17 and 18, intermediate filters 12A, 12B, and 12C, a bypass circuit 19, and the downstream amplifier 13. The second high-frequency power amplifier 20 includes the upstream amplifier 21, switches 27 and 28, intermediate filters 22A, 22B, and 22C, a bypass circuit 29, and the downstream amplifier 23.

Each of the intermediate filters 12A, 12B, and 12C attenuates the intermodulation distortion component causing an interfering wave, but has different filter characteristics.

The bypass circuits 19 and 29 are circuits that do not have a function of filtering a signal in the frequency band in use (circuits that do not aim to attenuate a given frequency band). For example, each of the bypass circuits 19 and 29 may be an impedance matching circuit including an inductor, a capacitor, or both of them, or may be a simple transmission Line.

For a communication form in which it is not necessary to have a function of filtering a signal in a frequency band in use, the switches 17 and 18 select the bypass circuit 19, not the intermediate filter 12A, 12B, or 12C. The switches 27 and 28 select the bypass circuit 29, not the intermediate filter 22A, 22B, or 22C. Thus, compared with a case in which a path through an intermediate filter is selected, the insertion loss is reduced, enabling a low-loss path to be selected.

The communication form in which it is not necessary to have a function of filtering a signal in a frequency band in use is, for example, a communication form in which a frequency band other than a frequency band in which the intermodulation distortion component causing an interfering wave occurs is used, or a communication form in which the antenna duplexers 14 and 24 (see FIG. 1) are capable of sufficiently attenuating the intermodulation distortion component causing an interfering wave. When these communication forms are used, the bypass circuits 19 and 29, not intermediate filters, are selected so that the insertion loss may be reduced.

Switching using the switches 17, 18, 27, and 28 is controlled by using an IC (Integrated Circuit). The IC has a function of determining a frequency band in use and a function of controlling switching using the switches. The IC determines filter characteristics with which occurrence of the intermodulation distortion component causing an interfering wave is eventually suppressed. In accordance with the result, the IC selects a given intermediate filter by using the switches 17, 18, 27, and 28. In addition, the IC determines whether or not the frequency band is a band in which the intermodulation distortion component causing an interfering wave occurs, or determines whether or not the antenna duplexers 14 and 24 are capable of sufficiently attenuating the intermodulation distortion component causing an interfering wave. In accordance with the result, the IC exerts control so that the switches 17, 18, 27, and 28 select intermediate filters or the bypass circuits. The IC is a RF (Radio Frequency) IC, a BB (Base Band) IC, a PA control IC, an application processor, or the like.

In the high-frequency power amplifying module 106 illustrated in FIG. 11, the first high-frequency power amplifier 10 includes the upstream amplifier 11, the switches 17 and 18, an intermediate filter 12V, the bypass circuit 19, and the downstream amplifier 13. The second high-frequency power amplifier 20 includes the upstream amplifier 21, the switches 27 and 28, an intermediate filter 22V, the bypass circuit 29, and the downstream amplifier 23.

The intermediate filters 12V and 22V are variable filter circuits having variable filter characteristics. Thus, a variable filter circuit may be used as an intermediate filter, and the IC may control the filter characteristics of the variable filter circuit so that the intermodulation distortion component causing an interfering wave is effectively attenuated. In addition, the variable filter circuit 22V also performs a function of blocking a signal at a receive frequency of the second band. Therefore, a signal (noise) at a receive frequency of the second band which is output from the second high-frequency power amplifier 20 is sufficiently suppressed. Thus, reduction in the receiver sensitivity of the second band which is caused by signal leakage in which a signal (noise) at a receive frequency of the second band leaks into the receiving circuit of the second band is suppressed.

The configuration of a variable filter encompasses, for example, a form in which a variable reactive circuit, such as a variable inductor or a variable capacitor, is coupled to a fixed filter.

Only the first high-frequency power amplifier 10 illustrated in the first embodiment in FIG. 1 may be replaced with the first high-frequency power amplifier 10 illustrated in FIG. 10 or 11. That is, the configuration of the second high-frequency power amplifier 20 in FIG. 1 may be used as it is. The second high-frequency power amplifier 20 is highly likely to use a path through an intermediate filter. In addition, addition of a bypass circuit causes an increase in the size of the module. Therefore, only the first high-frequency power amplifier 10 that is highly likely to need a bypass circuit is replaced with the first high-frequency power amplifier 10 in FIG. 10 or 11. Thus, while the insertion loss is reduced, reduction in size may be achieved compared with a case in which a filter bypass circuit is added to each of the first high-frequency power amplifier 10 and the second high-frequency power amplifier 20.

Only the second high-frequency power amplifier 20 illustrated in the first embodiment in FIG. 1 may be replaced with the second high-frequency power amplifier 20 in FIG. 10 or 11. That is, the configuration of the first high-frequency power amplifier 10 in FIG. 1 may be used as it is.

The actual transmission of a high-frequency signal is not limited to transmission using the entire frequency width of the transmit frequency band assigned to the communication band. For example, according to the 3GPP (Third Generation Partnership Project) standard, a channel band width (frequency band width) may be selected for transmission from 1.4 MHz, 3 MHz, 5 KHz, 10 MHz, 15 KHz, and 20 KHz, each of which is a channel band width (frequency band width) corresponding to the band width of a transmit modulation band. In this case, the selected transmit modulation band corresponds to a frequency band in use. The intermediate filter may use, as a pass band, only the transmit modulation band in the transmit band, and may attenuate transmit bands and receive bands other than the transmit modulation band in use.

The number of intermediate filters (12A, 12B, 12C, 22A, 22B, and 22C) included in the first high frequency power amplifier 10 and the second high-frequency power amplifier 20 illustrated in FIG. 10 is exemplary. The number of intermediate filters is not limited to the number illustrated in FIG. 10. Any number of intermediate filters may be used. The number of bypass circuits 19 and 29 included in the first high-frequency power amplifier 10 and the second high-frequency power amplifier 20 illustrated in also exemplary. Any number of bypass circuits may be used.

The number of intermediate filters (12V and 22V) included in the first high-frequency power amplifier 10 and the second high-frequency power amplifier 20 illustrated in FIG. 11 is exemplary. The number of intermediate filters is not limited to the number illustrated in FIG. 11, and any number of intermediate filters may be used. The number of bypass circuits 19 and 29 included in the first high-frequency power amplifier 10 and the second high-frequency power amplifier 20 illustrated in FIG. 11 is exemplary, and any number of bypass circuits may be used.

Fifth Embodiment

In a fifth embodiment, a high-frequency power amplifying module including a second high-frequency power amplifier including a receive filter for blocking a signal at a receive frequency of the second band will be described.

Figure 12:
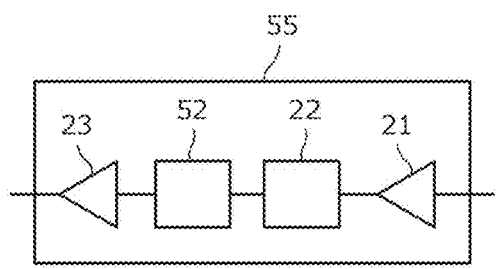
FIG. 12 is a block diagram illustrating the configuration of a second high-frequency power amplifier 55 according to a fifth embodiment.

FIG. 12 is a block diagram illustrating the configuration of a second high-frequency power amplifier 55 according to the fifth embodiment. The other configuration of the circuit unit (the high-frequency circuit unit of the portable terminal) is illustrated in the first embodiment in FIG. 1.

The second high-frequency power amplifier 55 illustrated in FIG. 12 includes the upstream amplifier 21, the intermediate filter 22, a receive filter 52, and the downstream amplifier 23. The intermediate filter 22 is a filter (first transmission filter) that passes a transmit signal in the second band and that blocks a signal in the transmit frequency band of the first band which produces the intermodulation distortion causing an interfering wave. The receive filter 52 blocks a signal at a receive frequency of the second band. Therefore, a signal (noise) at a receive frequency of the second band which is output from the second high-frequency power amplifier 55 is sufficiently suppressed. Thus, reduction in the receiver sensitivity of the second band which is caused by signal leakage in which the signal (noise) at a receive frequency of the second band leaks into the receiving circuit of the second band is suppressed.

In the present embodiment, the receive filter 52 is coupled downstream of the upstream amplifier 21. Therefore, even when a signal (noise) at a receive frequency of the second band is produced due to harmonic distortion caused in the upstream amplifier 21, the signal (noise) may be suppressed. In addition, the output level of the upstream amplifier 21 is relatively lower than the output level of the second high-frequency power amplifier 55. Therefore, the receive filter 52 may be a circuit operating with such low power. That is, regarding design of the receive filter 52, there are a wide range of choices.

In the present exemplary embodiment, the intermediate filter 22 and the receive filter 52 are separately provided, and may be unified as a single filter having the functions of the intermediate filter 22 and the receive filter 52. In this case, the unified filter is a fixed filter, and filters transmission waves producing the intermodulation distortion and noise of the receive band which is produced in the upstream amplifier 21. In this case, the fixed filter is implemented by using a band-pass a band elimination filter, or the like. Instead, the unified filter may function as a variable filter so as to filter transmission waves producing the intermodulation distortion and noise in the receive band which is produced in the upstream amplifier 21.

Sixth Embodiment

In a sixth embodiment, a high-frequency power amplifying module including a second high-frequency power amplifier including a receive filter for blocking a signal at a receive frequency of the second band will be described.

Figure 13:
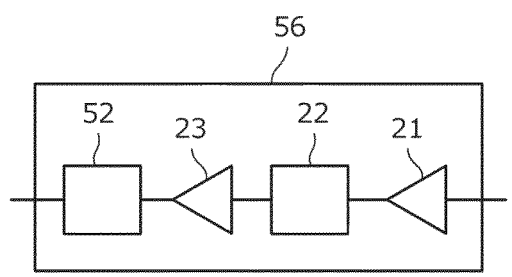
FIG. 13 is a block diagram illustrating the configuration of a second high-frequency power amplifier 56 according to a sixth embodiment.

FIG. 13 is a block diagram illustrating the configuration of a second high-frequency power amplifier 56 according to the sixth embodiment. The other configuration of the circuit unit (the high-frequency circuit unit of the portable terminal) is illustrated in the first embodiment in FIG. 1.

The second high-frequency power amplifier 56 illustrated in FIG. 13 includes the upstream amplifier 21, the intermediate filter 22, the downstream amplifier 23, and the receive filter 52. The intermediate filter 22 is a filter (first transmission filter) that passes a transmit signal in the second band and that blocks a signal in the transmit frequency band of the first band which produces the intermodulation distortion causing an interfering wave. The receive filter 52 blocks a signal at a receive frequency of the second band. Therefore, a signal (noise) at a receive frequency of the second band which is output from the second high-frequency power amplifier 55 is sufficiently suppressed.

In the present embodiment, the receive filter 52 is coupled downstream of the downstream amplifier 23. Therefore, even when a signal (noise) at a receive frequency of the second band is produced also in the downstream amplifier 23, the signal (noise) is attenuated.

Finally, all points in the description about the above-described embodiments are exemplary, and are not limiting. A person skilled in the art may make changes and modifications as appropriate. For example, partial replacement or combination of the configurations described in the different embodiments may be made. The scope of the present invention is indicated by the claims, not by the above-described embodiments. Further, the scope of the present invention includes changes of the embodiments which are made within the claims and the scope of equivalents to the claims.

REFERENCE SIGNS LIST

C1 capacitor
CPf, CPr coupling path
L1 inductor
L11, L21 choke coil
L13, L23 choke coil
10 first high-frequency power amplifier
11, 21 upstream amplifier
12, 12A, 12B, 12C intermediate filter (second transmission filter)
22, 22A, 22B, 22C intermediate filter (first transmission filter)
12V intermediate filter (variable frequency filter)
22V intermediate filter (variable frequency filter)
13, 23 downstream amplifier
14, 24 antenna duplexer
15, 25 switch
16, 26 LNA
17, 27 switch
18, 28 switch
19, 29 bypass circuit
20 second high-frequency power amplifier
22A upstream filter
22B intermediate filter
30 diplexer
31 antenna
32 spectrum analyzer
40 filter
41 first signal generating circuit
42 second signal generating circuit
43 band-pass filter
44 coupler
52 receive filter
55, 56 second high-frequency power amplifier
101, 103, 104 high-frequency power amplifying module
201 RFIC

The invention claimed is:

1. A high-frequency power amplifying module for a communication device that simultaneously transmits and receives radio frequency signals in a first communication band and a second communication band, the high-frequency power amplifying module comprising:
    a first high-frequency power amplifier that amplifies radio frequency signals in the first communication band, the first high-frequency power amplifier comprising a second transmission filter configured to attenuate a transmission frequency of the second communication band; and
    a second high-frequency power amplifier that amplifies radio frequency signals in the second communication band, the second high-frequency power amplifier comprising a first transmission filter, a second upstream amplifier, and a second downstream amplifier,
    wherein the first communication band and the second communication band produce intermodulation distortion due to the transmission frequency of the first communication band and a transmission frequency of the second communication band, the intermodulation distortion having a frequency within a reception frequency band of the second communication band,
    wherein the first transmission filter is configured to attenuate the transmission frequency of the first communication band,
    wherein the second upstream amplifier amplifies a transmission signal in the second communication band,
    wherein the first transmission filter is disposed between the second upstream amplifier and the second downstream amplifier,
    wherein the second downstream amplifier amplifies a signal having passed through the first transmission filter,
    wherein the first transmission filter, the second upstream amplifier, and the second downstream amplifier are mounted on a single board, and
    wherein the first transmission filter and the second transmission filter are formed as a single high-frequency power amplifying module that is different from a high-frequency circuit that is coupled to the high-frequency power amplifying module.

2. The high-frequency power amplifying module according to claim 1,
    wherein the first high-frequency power amplifier further comprises a first upstream amplifier and a first downstream amplifier,
    wherein the first upstream amplifier amplifies a transmission signal in the first communication band,
    wherein the second transmission filter is disposed between the first upstream amplifier and the first downstream amplifier, and wherein the first downstream amplifier amplifies a signal having passed through the second transmission filter.

3. The high-frequency power amplifying module according to claim 1,
wherein the second high-frequency power amplifier further comprises a reception filter configured to attenuate the reception frequency band of the second communication band.

4. The high-frequency power amplifying module according to claim 3,
wherein the first transmission filter and the reception filter are both embodied as a single variable frequency filter.

5. The high-frequency power amplifying module according to claim 3,
wherein the first transmission filter and the reception filter are both embodied as a single fixed frequency filter.

6. The high-frequency power amplifying module according to claim 1,
wherein the first communication band comprises frequencies greater than the second communication band.

7. The high-frequency power amplifying module according to claim 1,
wherein the first high-frequency power amplifier is disposed at a distance from the second high-frequency power amplifier, the distance corresponding to an isolation of −70 dB or less.

8. The high-frequency power amplifying module according to claim 1,
wherein the first high-frequency power amplifier and the second high-frequency power amplifier have a common power supply path, and
the high-frequency power amplifying module further comprises a filter that is inserted in the common power supply path and that attenuates the transmission frequency of the first communication band.

9. The high-frequency power amplifying module according to claim 8, further comprising:
a bypass circuit that transmits a signal through a path that does not go through the filter.

10. A communication apparatus comprising:
the high-frequency power amplifying module according to claim 1.

11. A high-frequency power amplifying module for a communication device that simultaneously transmits and receives radio frequency signals in a first communication band and a second communication band, the high-frequency power amplifying module comprising:
a first high-frequency power amplifier that amplifies radio frequency signals in the first communication band; and
a second high-frequency power amplifier that amplifies radio frequency signals in the second communication band, the second high-frequency power amplifier comprising a first transmission filter, a second upstream amplifier, and a second downstream amplifier,
wherein the first communication band and the second communication band produce intermodulation distortion due to a transmission frequency of the first communication band and a transmission frequency of the second communication band, the intermodulation distortion having a frequency within a reception frequency band of the second communication band,
wherein the first transmission filter is configured to attenuate the transmission frequency of the first communication band,
wherein the second upstream amplifier amplifies a transmission signal in the second communication band,
wherein the first transmission filter is disposed between the second upstream amplifier and the second downstream amplifier,
wherein the second downstream amplifier amplifies a signal having passed through the first transmission filter,
wherein the second high-frequency power amplifier further comprises a reception filter configured to attenuate the reception frequency band of the second communication band, and
wherein the first transmission filter and the reception filter are disposed between the second upstream amplifier and the second downstream amplifier.

12. A high-frequency power amplifying module for a communication device that simultaneously transmits and receives radio frequency signals in a first communication band and a second communication band, the high-frequency power amplifying module comprising:
a first high-frequency power amplifier that amplifies radio frequency signals in the first communication band; and
a second high-frequency power amplifier that amplifies radio frequency signals in the second communication band, the second high-frequency power amplifier comprising a first transmission filter, a second upstream amplifier, and a second downstream amplifier,
wherein the first communication band and the second communication band produce intermodulation distortion due to a transmission frequency of the first communication band and a transmission frequency of the second communication band, the intermodulation distortion having a frequency within a reception frequency band of the second communication band,
wherein the first transmission filter is configured to attenuate the transmission frequency of the first communication band,
wherein the second upstream amplifier amplifies a transmission signal in the second communication band,
wherein the first transmission filter is disposed between the second upstream amplifier and the second downstream amplifier,
wherein the second downstream amplifier amplifies a signal having passed through the first transmission filter,
wherein the second high-frequency power amplifier further comprises a reception filter configured to attenuate the reception frequency band of the second communication band,
wherein the first transmission filter is disposed between the second upstream amplifier and the second downstream amplifier, and
wherein the reception filter is coupled downstream of the second downstream amplifier.

* * * * *

UNITED STATES PATENT AND TRADEMARK OFFICE
CERTIFICATE OF CORRECTION

PATENT NO. : 10,116,348 B2
APPLICATION NO. : 15/635710
DATED : October 30, 2018
INVENTOR(S) : Hidenori Obiya et al.

Page 1 of 1

It is certified that error appears in the above-identified patent and that said Letters Patent is hereby corrected as shown below:

In the Specification

Column 4, Line 63, "SPT" should be -- SPxT --.

Column 6, Line 53, "897" should be -- 897.5 --.

Signed and Sealed this
Eighth Day of January, 2019

Andrei Iancu
*Director of the United States Patent and Trademark Office*